Sept. 9, 1958   A. C. SAMPIETRO ET AL   2,850,878
POWER STEERING AND ACCESSORY SYSTEM
Filed March 23, 1956   3 Sheets-Sheet 3

Inventors
Achilles C. Sampietro
James R. Jeromson Jr.
Attys

United States Patent Office 2,850,878
Patented Sept. 9, 1958

2,850,878

POWER STEERING AND ACCESSORY SYSTEM

Achilles C. Sampietro, Detroit, Mich., and James R. Jeromson, Jr., Wickliffe, Ohio, assignors to Thompson Products, Inc., Cleveland, Ohio, a corporation of Ohio Application March 23, 1956, Serial No. 573,554

10 Claims. (Cl. 60—97)

The present invention relates to control systems for automotive vehicle accessories and is, more particularly, concerned with the provision of a novel central power supply, and the control thereof, for hydraulically operated vehicle accessories.

As those skilled in the art of automotive engineering are aware, power accessories for vehicle use have long been known. For example, it has been the practice in certain luxury vehicles to provide power operation of the windows, seats, trunk lid and convertible top. Although the power assist systems for vehicle steering have likewise been known for some time their adoption by the automotive industry was, with few exceptions, delayed until recently. At the present time, however, increasingly large numbers of automotive vehicles are being manufactured with a combination of power accessories and power steering.

At present, commercial installations in automotive vehicles provide separate power sources for the power steering system and the remainder of the accessories such as, for example, the windows and seat. The combination of the power steering source of power with that of applying the remaining accessories has heretofore been considered impractical, in spite of its desirability, because of the absolute necessity for steering operation independently of operation of the accessories. Further, since a rechargeable accumulator is ordinarily considered essential to satisfactory operation of accessory units, a combined system has not heretofore been considered feasible since the open center type of power steering valve ordinarily used provides an arrangement in which no pressure is maintained by the pump during periods of steering inactivity and hence accumulator charging pressure would not be maintained except when the pressure is needed for the steering apparatus.

In accordance with the principles of the present invention the pump provided for operation of the power steering system is successfully utilized for the actuation of additional accessory units and for maintaining an accumulator associated with such accessories in fully charged condition. At the same time, over-ride control is provided which provides absolute preference for the power steering at all times, thereby preventing failure of the steering during utilization of the other power accessories.

In accordance with the principles of the present invention the power steering motor and control valve are of the conventional type, preferably employing the open-center valve construction in which no fluid pressure is developed in the power steering circuit except during steering operation. Likewise, the vehicle accessories, such as the power seat, etc., are hydraulically actuated by conventional hydraulic motors supplied by an hydraulic acccumulator of conventional design. A single hydraulic pump is provided and the output thereof is directed to a steering over-ride valve and from thence to a charging valve.

The charging valve constructed in accordance with the principles of the present invention is provided with a fluid pressure inlet from the pump and over-ride valve and two outlets leading respectively to the power steering system and the accumulator. Fluid under pressure is directed to the accumulator by the charging valve at all times when the accumulator pressure is below a predetermined minimum charge value. After the accumulator pressure has reached a predetermined full charge value further flow through the valve is directed to the power steering system. The charging valve is responsive to the pressure in the accumulator and operates in response to full pressure to provide an unloading function at fluid pressures in excess thereof.

The over-ride valve is positioned between the charging valve and the pump. It is provided with a pressure responsive portion directing fluid from the pump to the power steering system, and an accumulator charging passage which is normally open to permit flow of fluid under pressure from the pump to the above mentioned charging valve. Upon operation of the power steering system at times when the charging valve is in a position to permit charging of the accumulator and to block flow from the charging valve into the power steering system, the pressure responsive portion of the over-ride valve operates to close off the accumulator charging passage and fully open a passage through the over-ride valve from the pump to the power steering system. At the same time, closure of the accumulator charging passage through the over-ride valve prevents utilization of any part of the fluid from the pump for purposes other than steering at times when steering pressure is needed.

It is, accordingly, an object of the present invention to provide a novel and improved power steering and accessory system wherein a single source of power is utilized for all power units.

Still another object of the present invention is to provide a power steering system of the open-center type in cooperation with accumulator operated accessories.

Yet another object of the present invention is to provide a novel control valve system for power steering systems or the like.

Still a further object of the present invention is to provide a single-source power steering and accessory system in which all power motors are energized by a single pressure source but wherein the power steering system is accorded complete dominance and is assured of satisfactory operating pressure at all times.

Yet a further object of the present invention is to provide a novel over-ride and charging valve structure for integrating a single source of pressure into a combined power steering and automotive accessory system.

A feature of the invention resides in the utilization of an over-ride valve normally passing a limited volume of fluid under pressure from a pump to the power steering system and operable under an increase in power steering pressure, occasioned by steering action, to direct the entire output of the pump to the power steering system.

Still another feature of the invention is the provision of an accumulator for one or more automotive accessories, which accumulator is charged through a pressure responsive charging valve operable to charge the accumulator at all times when the accumulator is below a predetermined desired pressure charge, except during periods of time in which the power steering system is in actual operation.

Still other and further objects and features of the present invention will at once become apparent to those skilled in the art from a consideration of the attached drawing wherein a preferred form of the invention is shown by way of illustration only, and wherein.

As shown on the drawings.

Figure 1:
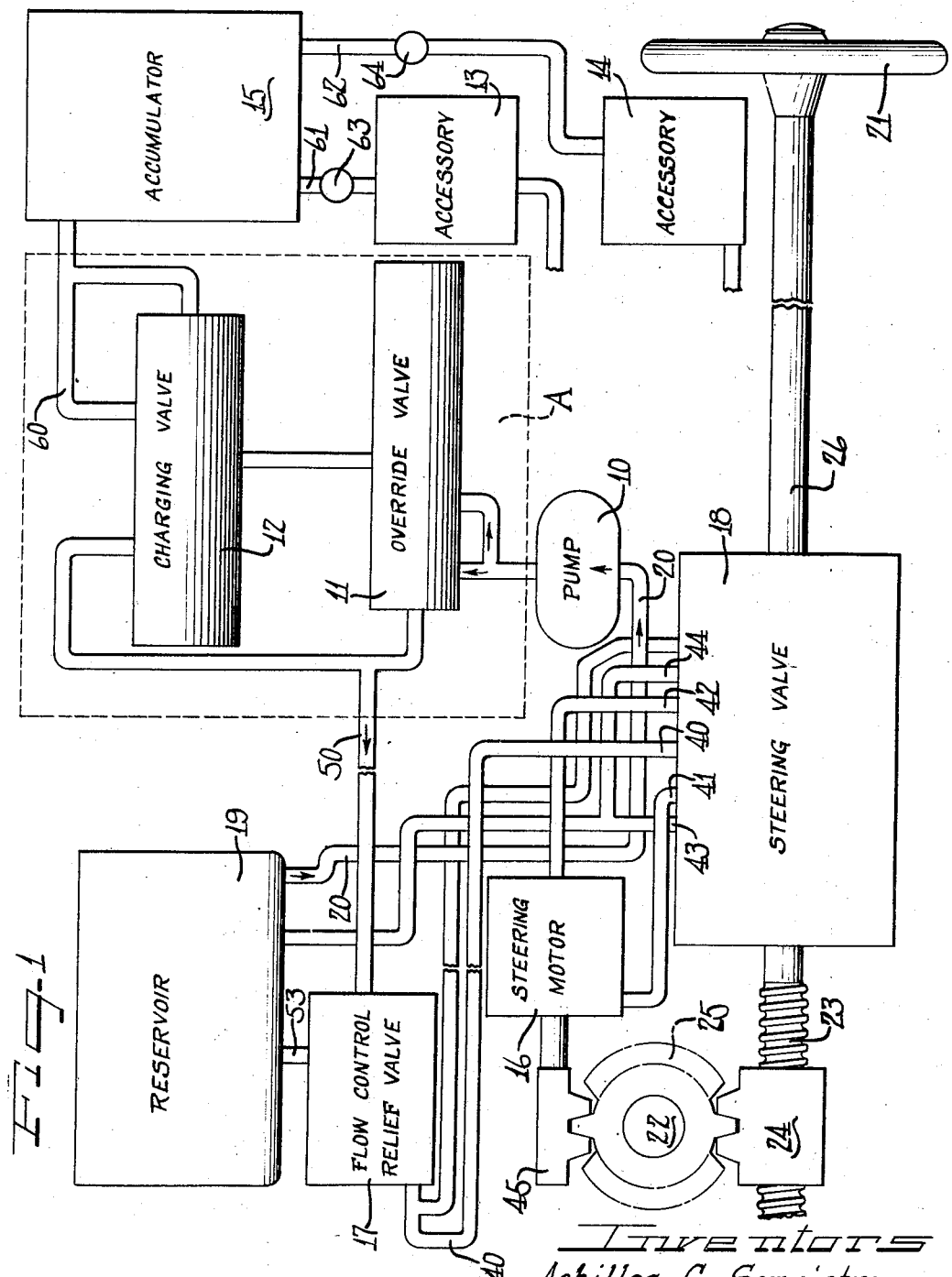
Figure 1 is a diagrammatic illustration of the combined power steering and vehicle accessory system.

As may be seen from a consideration of Figure 1, wherein a diagrammatic illustration of the entire hydraulic system is presented, a hydraulic pump 10 operates through an override valve 11, and a charging valve 12 to alternatively control accessories 13 and 14 through an accumulator 15 or a steering motor 16 via a flow control valve 17 and a power steering valve 18. A reservoir 19 maintains a supply of hydraulic fluid for the pump 10 which it supplies through a low pressure conduit 20 to provide a closed hydraulic system.

The specific construction of the power steering valve 18 and the power steering motor 16 do not comprise a part of the present invention. However, in view of their relationship to the remainder of the system they are illustrated in some detail in Figure 2. As there shown, the steering wheel 21 is connected to the steering output or cross shaft 22 by means of a worm and nut reduction gear 23, 24 and worm wheel 25. The steering wheel shaft 26 is slidably mounted in a valve housing 27 and carries as a reciprocal part thereof a valve core 28. The valve core 28 has end lands 29, 30 and a central land 31 which cooperate respectively with annular grooves 32, 33 and 34 in the housing 27.

The steering shaft 26 and the valve core 28 are maintained in a valve-centered or valve-neutral condition by means of a pair of thrust bearings 35 and 36 acting against spring biased plungers 37 and 38, respectively. As viewed in Figure 2 reciprocal movement of shaft 26 toward the left would cause movement of the thrust washer or plate 36 to the left, moving the plunger 38 against spring 39 which tends to resist such movement and returns the shaft and valve core to the neutral position. Conversely, movement of the shaft 26 toward the right would move thrust washer or plate 35 to the right which in turn moves the plunger 37 to compress spring 39.

Reciprocal movement of the steering shaft is utilized for controlling the energization of the power steering motor 16 in a simple manner. Since axial movement of the steering shaft 26 is not confined except by the valve 18, initial manual steering motion of the steering wheel 21 will, if any steering load is present, first cause the shaft 26 to reciprocate before rotation of the cross shaft 22 occurs. This is true since rotation of the shaft 22 requires torque to overcome the steering load and reciprocation of the shaft 26 requires a lesser value to compress the spring 39. The torque at which valve action occurs may, of course, be regulated by variation in the spring constant of the spring 39 since it is clear that no valve actuation will occur until such time as the steering torque required exceeds the torque necessary to cause compression of the spring 39 sufficiently to cause valve action.

Figure 2:
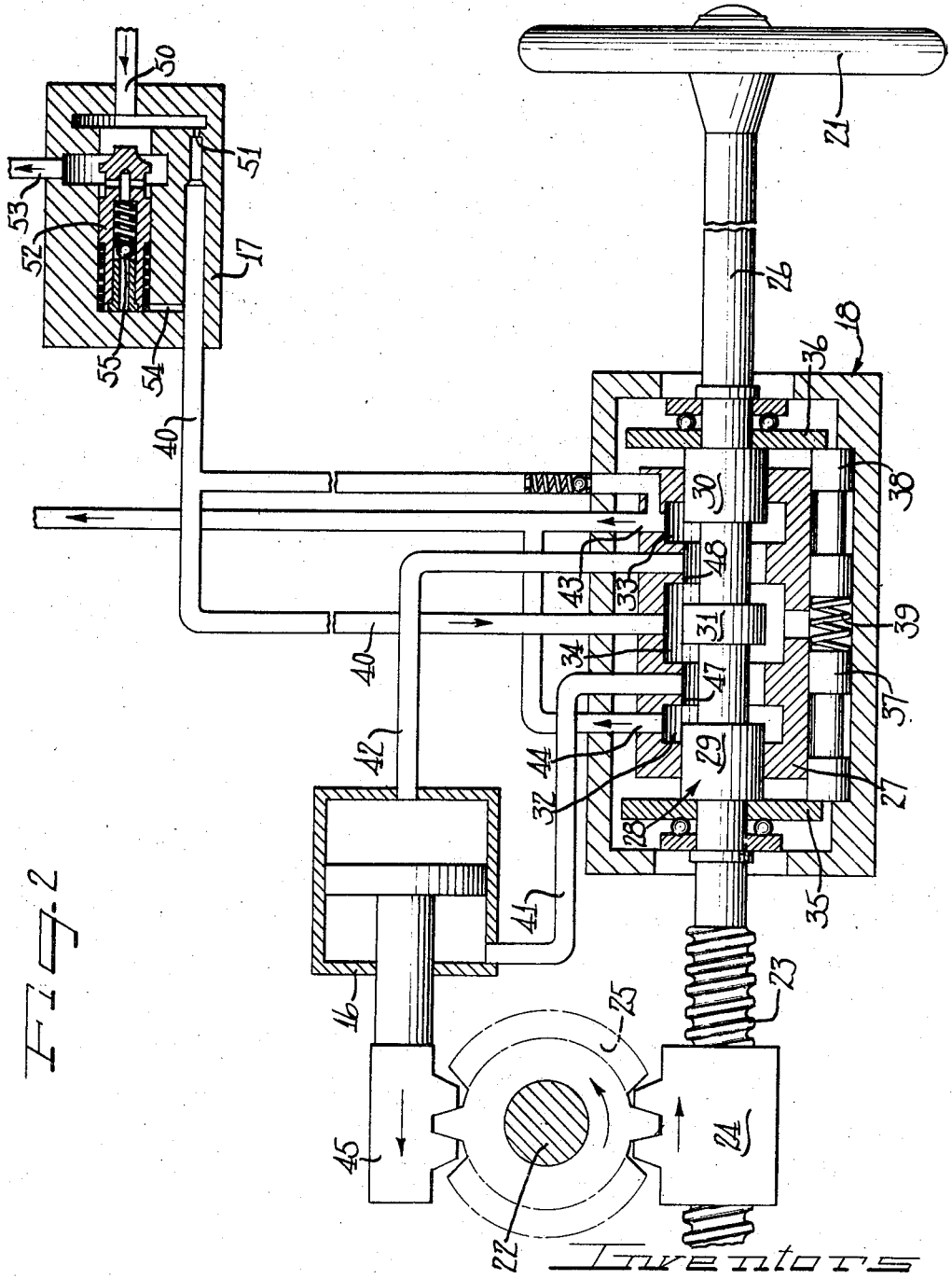
Figure 2 is an enlarged illustration of the power steering system portion of the over-all system shown in Figure 1.

In operation, in the embodiment illustrated, rotation of the steering shaft 26 in a clockwise direction as viewed from the right in Figure 2 would cause movement of the worm nut 24 toward the right to rotate the cross shaft 22 in a counterclockwise direction in the absence of steering torque. Upon the application of a steering torque load, an initial reciprocation of the shaft 26 toward the left will occur. This movement toward the left will cause land 31 to block off the flow of high pressure fluid from the fluid supply conduit 40 to the motor conduit 41. At the same time, the land 30 moves to the left blocking off the motor conduit 42 from the low pressure sump port 43. As a result, fluid under pressure flows through conduit 42 energizing the motor 16 to actuate the ram 45 toward the left aiding the counterclockwise rotation of the cross shaft 22 and providing a power boost to the steering in the same direction as the application of manual torque. Rotation of the steering wheel 21 in the opposite or counterclockwise direction will similarly block off conduit 42 from the supply conduit 40 and block off the sump conduit 44 from the motor conduit 41 causing movement of the ram 45 toward the right.

It will thus be seen that under normal circumstances of operation the application of a steering motion of the steering wheel 21 will cause a build up of pressure in the annular groove 34 which will, depending upon the direction of reciprocation of the shaft 26, be applied to the power steering motor conduits 41 or 42. When no steering movement is taking place fluid may circulate freely from the supply conduit 41 to the sump ports 43 and 44 since the spaces between the valve core lands 29, 30 and 31 are of greater length than the corresponding lands 47 and 48 in the valve housing 27. This operational characteristic of continuous flow in the valve-neutral condition is conventionally considered the characteristic of a continuous flow or open-center steering valve. It provides a reliable steering valve which continually flushes small particles into the sump or reservoir and minimizes the gum deposits sometimes associated with closed center or non-continuous flow valve systems. In the present system the characteristic of build up in the valve pressure with steering motion of the steering wheel 21 is utilized for controlling the distribution of hydraulic fluid between hydraulic accessories on the automotive vehicle and the steering motor. Additionally, the pressure build up provides feel back at the steering wheel 21 by action against the adjacent ends of the plungers 37 and 38 in conjunction with the spring 39.

Hydraulic fluid under pressure is supplied to the power steering valve 18 via the supply conduit 40 from the override and charging valves 11 and 12 via a flow control relief valve 17 and conduit 50. As shown in Figure 2, fluid flows from the conduit 50 to the supply conduit 40 via a flow control orifice 51 and, upon the application of excessive pressure in the conduit 50, flows to the sump via pressure relief valve 52 and conduit 53. Upon steering movement, with subsequent build up of pressure in the supply conduit 40, the relief valve plunger 52 is increasingly resistive to by-pass fluid from conduit 50 to the sump conduit 53 as a result of the application of fluid under pressure to the rear of the valve 52 via valve port 54. The valve 17 thereby provides a continuous flow of hydraulic fluid in amounts needed to operate the power steering system adequately and smoothly even though a large capacity hydraulic pump is provided. The provision of a large pump, sufficient to supply the needs of an entire power accessories system without such a control valve 17 would provide excessive quantities of fluid flowing through the power steering control valve with undesirable abruptness of action. In addition to the improved action thus provided, a relief valve 55 is provided in the flow control valve to relieve any excessive pressure built up in the conduit 40, such as might occur in the event that the vehicle wheels were locked against a high roadside curb or similar obstruction. This relief eliminates any possibility of damage to the power motor, valving or conduits as a result of excessive pressures which could build up under such a circumstance.

In accordance with the principles of the present invention, fluid from the pump 10 is directed to the power steering system about set forth via conduit 50 through control valves 11 and 12. These valves also operate to provide fluid from the pump 10 to the accumulator 15 via conduit 60. The accumulator 15 is conventional in construction and stores fluid under a pressure of a predetermined value, such as for example 750 pounds per square inch. This accumulated fluid under pressure may be directed to any conventional power motors of the accessories 13 and 14 via respective conduits 61 and 62 under the control of conventional valves 63 and 64. It will be understood that the accessories 13 and 14 are of secondary importance insofar as operation of the vehicle is concerned and that it is accordingly essential that the power steering have complete dominance of the system. At the same time, since the power steering system is ordinarily not in operation it is desirable to utilize the fluid output from the pump for such secondary purposes as operating power seats, power windows and the like. The interrelated control valves 11 and 12 of the present invention provide the necessary integration of the power steering and accessory systems.

Figure 3:
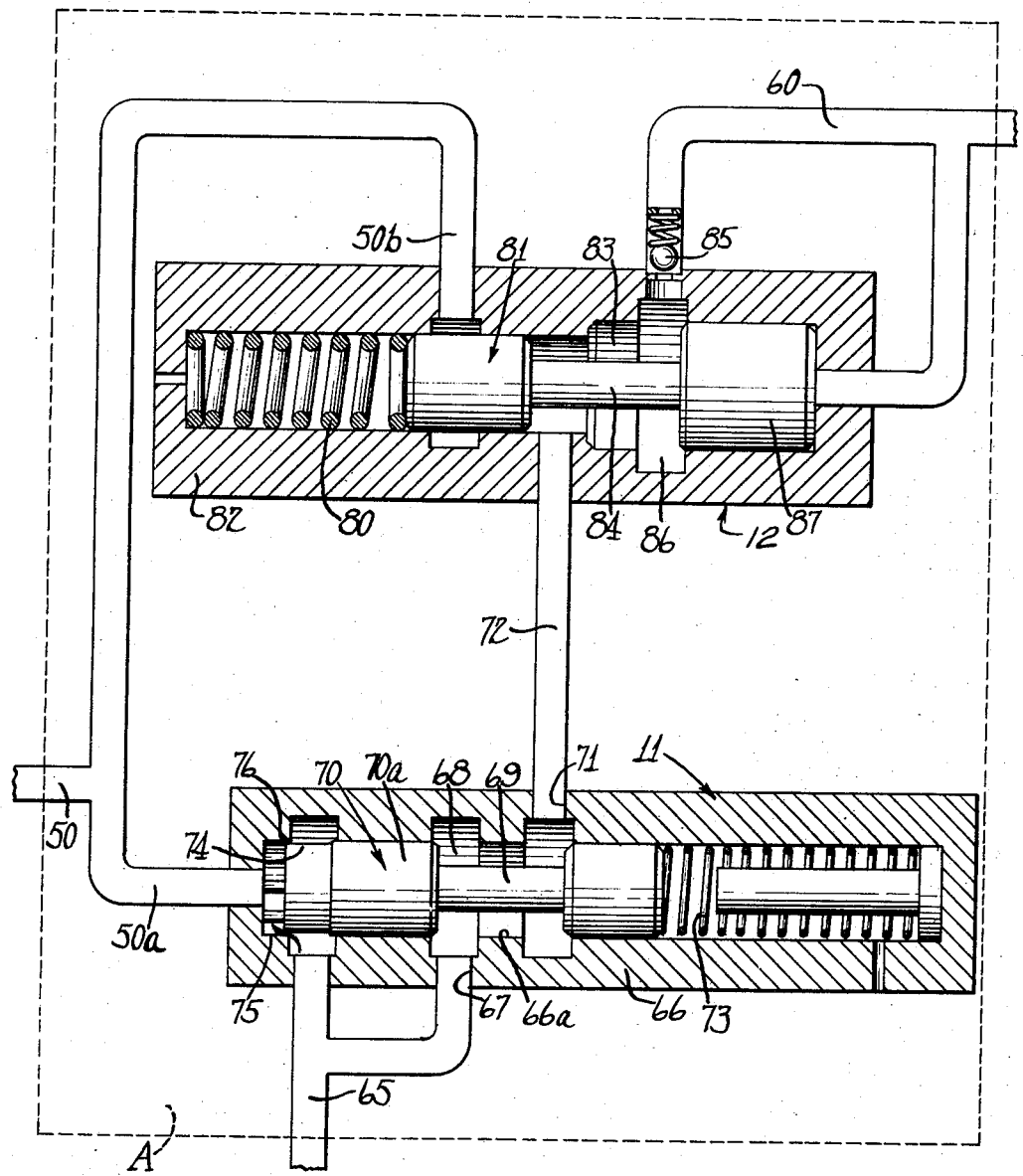
Figure 3 is an enlarged detail view of the control valve arrangement incorporated in Figure 1 within the dotted rectangle A.

As may be seen from a consideration of the enlarged view of Figure 3 hydraulic fluid leaves the pump 12 and is directed to the override valve 11 via conduit 65. In a normal situation in which the power steering is not in operation the fluid in conduit 65 will flow through the housing of the valve 66 via port 67, through chamber 68, formed by the reduced diameter portion 69 of the spool valve generally indicated at 70. Fluid leaves the housing 66 by a port 71 and is directed to the accumulator charging valve 12 via conduit 72.

In the situation in which no power steering is taking place, as above set forth, the valve core 70 of the override valve 11 is positioned in its extreme left hand condition by means of a spring 73. In this position a reduced or necked portion 74 of the core 70 cooperates with an annular recess or groove 75 in the housing 66 to provide a restricted annular passage between conduit 67 and conduit 50a leading to the power steering valve 18 via the conduit 50. Since no pressure build up exists in the conduit 50 during periods of inactivity of the power steering system the trickle of liquid past the restricted orifice 76 provides no pressure build up against the left hand end of the spool 70 in opposition to the spring 73 and accordingly all fluid from the pump 10 is directed via the conduits 65, chamber 68 and conduit 72 to the charging valve 21.

The charging valve 12 is shown in Figure 3 in position for charging the accumulator 15. This charging will take place when the accumulator pressure drops below a predetermined value determined by the spring 80 acting against the charging valve spool core 81 which is reciprocably mounted within the housing 82. The opposite end of the valve core 81 is biased toward the left by means of the hydraulic pressure in the conduit 60 and hence in the accumulator 15. Accordingly, it will be seen that the flow of fluid from the pump 10 via conduits 65 and 72 through chamber 83 formed by the reduced diameter portion 84 of the valve core 81, past check valve 85 into conduit 60 and accumulator 15 will, when sufficient pressure has been built up, force the spool core 81 to the left cutting off the annulus 86 and directing fluid to the conduit 50 via the charging outlet conduit 50b. Check valve 85 prevents any flow whatever from the acculator 15 back to the pump 10 or to the power steering system.

A cycle of operation will be as follows starting from an original condition in which the accumulator 15 is uncharged and the power steering is not in operation. Under such circumstances, the spool core 81 of the charging valve 12 will be in its left hand position with the conduit 50b uncovered to flow from the conduit 72 and the conduit 60 blocked by the large end 87 of the core 81. With utilization of the secondary accessories, pressure in the accumulator 15 will drop and the pressure acting against the end 87 of the valve core 81 will accordingly be reduced. As the pressure drops, the spring 80 will gradually move the valve core 81 to the right until it just barely closes off the connection between the chamber 83 and the conduit 50b. Upon this occurrence the outlet of the pump 10 will be required to flow through the restricted orifice 76 or into the accumulator 15. Since the accumulator 15 will be at some predetermined minimum storage pressure, a pressure built up in the conduits 65 and 72 must be accomplished before additional charging will take place. In view of the restriction formed by the restricted passageway 76 this pressure build up immediately occurs in the conduit 72 and chamber 83. In view of the largeness of the end 87 of the core 81, the increased pressure in chamber 83 will move the spool core 81 all the way to the right to the position viewed in Figure 3 and the increasing pressure will unseat valve 85 and charge the accumulator until the pressure in conduit 60 attains a value sufficient to press the spring 80 to a left hand position venting chamber 83 to the power steering conduit 50b. When the power steering system is not in operation venting of the system to the conduit 50 will merely deliver the outlet of the pump to the reservoir via the sump conduits 43 and 44 in the valve 18.

If at any time when the accumulator is charged, the power steering valve 18 is actuated to energize the power steering motor 16, fluid from the pump 10 will pass through conduit 65, chamber 68, conduit 72, chamber 83, conduit 50b, conduit 50, valve 17 and conduit 40 to the power steering valve where pressure will be built up to actuate the motor 16. Upon a build up in pressure at the valve 18, the pressure build up will, of course, extend back to the pump 10 and will exist in conduit 50a as well. Upon the build up of pressure in the conduit 50a a substantial force will be provided against the spool 70 biasing it against the spring 73 into a position in which the restriction 76 is eliminated and fluid may flow directly in conduit 50 via conduit 50a.

Likewise, in the event that the accumulator 15 is uncharged, and accordingly in the act of charging, when the power steering is operated by valve 18, fluid pressure will build up in conduits 50 and 50a forcing the valve core 70 to the right eliminating the restrictions 76 and providing a direct path of fluid flow from conduit 65 to conduit 50a. This build up in conduits 50 and 50a will occur upon steering action, even though the valve core 81 of the charging valve 12 is in its right hand position blocking conduits 50b, in view of the small fluid flow permitted to pass through the restricted orifice 76, and in view of the substantial cut-off of flow occasioned by the steering valve 18 during steering action. At the same time that the valve core 70 moves toward the right to directly connect conduits 65 and 50a, the portion 70a thereof blocks off flow of fluid to conduit 72 by cooperation with the land 66a in the housing 66. Accordingly, during operation of the steering gear all communication between the pump 10 and the accumulator is discontinued and the power steering is given complete precedence in the system. In this manner, the accumulator will be charged at any time when the power steering system is not in operation and with the provision of the accumulator 15, accessory motors may be satisfactorily used at substantially any time. It will be noted that when the power steering is in operation the minimum normal accumulator pressure may drop to a point substantially below the normal value at which recharging is instigated. This is true since during operation of the steering gear movement of the valve core 81 to the right to the position shown in Figure 3 will not provide recharging of the accumulator. Since the usual accessory motor is capable of operation at much lower pressures than the desired accumulator pressure, however, no disadvantage results from the arrangement and, in fact, satisfactory operation of the accessories at all times is assured.

It will thus be seen that we have provided a novel, integrated, hydraulic power system in which a power steering apparatus is utilized in combination with an accessory system employing a high pressure accumulator. Through the utilization of the accumulator and the valving of the present invention, operation of the accessory units may be undertaken at substantially any time during operation of the vehicle independently of the steering operation. At the same time, the power steering pump is utilized for maintaining the accumulator in a charged condition without under any circumstances depriving the power steering system of sufficient fluid for satisfactory operation at all times. By means of the present system the high pressure pump employed for power steering is placed in service over a greater period of the time and additionally, separate, accessory pumps are eliminated, thereby rendering the over-all system substantially less expensive.

It will be understood that variations and modifications of the present invention may be made without departing from the scope of the novel concepts hereinabove set forth. It is, accordingly, our intention that the scope of the invention be limited solely by that of the hereinafter appended claims.

We claim as our invention:

1. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor.

2. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurize above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a separate valve serially connected between said pump and said charging valve and having means therein movable in response to operation of said power steering motor to block flow from said pump to said charging valve and redirect flow from said pump to said power steering valve.

3. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a separate valve serially connected between said pump and said charging valve and having means therein movable in response to pressure in said power steering motor to block flow from said pump to said charging valve and redirect fluid flow from said pump to said power steering valve.

4. In combination in a vehicle, a hydraulic power system comprising a pump, a power steering motor, a power steering valve operable on steering of the vehicle to direct flow from said pump to said power steering valve to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, check valve means preventing flow from said accumulator back through said charging valve at all times, and override valve means operative to overrule said charging valve and deliver fluid from said pump to said power steering valve to the exclusion of said accumulator when said power steering valve operates to energize said power steering motor.

5. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a housing, a movable core, said core and housing having alignable ports for passage of fluid from said pump to said charging valve means, means biasing said core relative to said housing to move said ports into alignment, a pressure chamber in said housing defined by said housing and said core whereby pressure therein acts against said biasing means, a restricted orifice leading fluid from said pump to said chamber, a conduit in said housing connecting said chamber to said power steering valve for fluid connection with said power steering motor, whereby actuation of said power steering valve to actuate said power steering motor will cause pressure build up in said chamber to overrule said biasing means to misalign said ports and block off fluid flow to said charging valve means.

6. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a housing, a movable core, said core and housing having alignable ports for passage of fluid from said pump to said charging valve means, means biasing said core relative to said housing to move said ports into alignment, a pressure chamber in said housing defined by said housing and said core whereby pressure therein acts against said biasing means, a restricted orifice leading fluid from said pump to said chamber, a conduit in said housing connecting said chamber to said power steering valve for fluid connection with said power steering motor, whereby actuation of said power steering valve to actuate said power steering motor will cause pressure build up in said chamber to overrule said biasing means to misalign said ports and block off fluid flow to said charging valve means and means rendering said restricted orifice ineffective and directing the full flow from said pump to said power steering valve upon movement of said core to misalign said ports.

7. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a housing, a movable core in said housing, means biasing said core into a first position in which ports in said housing and core are aligned to direct flow to said charging valve means from said pump, a pressure chamber in said housing having one wall thereof formed by said core whereby pressure in the chamber moves said core against said biasing means, a restricted orifice connecting said pump to said chamber when said core is in said first position, a conduit connecting said chamber to said power steering valve whereby steering pressure is applied to said chamber and said core is moved to a second position in which said ports are blocked during steering and whereby fluid is thus limited to movement to said power steering valve.

8. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a separate valve serially connected between said pump and said charging valve means and comprising a housing, a movable core in said housing, means biasing said core into a first position in which ports in said housing and core are aligned to direct flow to said charging valve means from said pump, a pressure chamber in said housing having one wall thereof formed by said core whereby pressure in the chamber moves said core against said biasing means, a restricted orifice connecting said pump to said chamber when said core is in said first position, a conduit connecting said chamber to said power steering valve whereby steering pressure is applied to said chamber and said core is moved to a second position in which said ports are blocked during steering and whereby fluid is thus limited to movement to said power steering valve.

9. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a separate valve serially connected between said pump and said charging valve means, a cylindrical housing, a reciprocal core in said housing, means at one end of said core biasing said core into a first position in which ports in said housing and core are aligned to direct fluid to said charging valve means from said pump, a pressure chamber at the other end of said core and incorporating the other end of said core as a wall thereof whereby pressure in said chamber moves said core against said biasing means to misalign said ports and a restricted orifice connecting said pump to said chamber when said core is in said first position, a conduit connecting said chamber to said power steering valve whereby steering pressure is applied to said chamber and said core is moved to a second position in which said ports are blocked during steering and whereby fluid is thus limited to movement to said power steering valve.

10. In combination in a vehicle, a hydraulic power system comprising a pump, a power steering motor, a power steering valve operable on steering of the vehicle to direct flow from said pump to said power steering motor to build up pressure therein, an accessory motor, an accumulator for energizing said accessory motor, charging valve means controlling fluid flow from said pump to said steering valve and permitting flow thereto when said hydraulic accumulator is pressurized above a predetermined value only and operative to cut off said flow and direct fluid to said accumulator when said accumulator pressure is below said predetermined value, and override valve means operative to overrule said charging valve and deliver fluid from said pump to said power steering valve to the exclusion of said accumulator when said power steering valve operates to energize said power steering motor, said override valve comprising a separate valve serially connected between said pump and said charging valve means, a cylindrical housing, a reciprocal core in said housing, means at one end of said core biasing said core into a first position in which ports in said housing and core are aligned to direct fluid to said charging valve means from said pump, a pressure chamber at the other end of said core and incorporating the other end of said core as a wall thereof whereby pressure in said chamber moves said core against said biasing means to misalign said ports and a restricted orifice connecting said pump to said chamber when said core is in said first position, a conduit connecting said chamber to said power steering valve whereby steering pressure is applied to said chamber and said core is moved to a second position in which said ports are blocked during steering and whereby fluid is thus limited to movement to said power steering valve, said restricted orifice comprising an annular neck in the periphery of said core at the end thereof forming said chamber, said neck cooperating with an annular groove in said housing whereby movement of said core against said biasing means removes the restriction and fully connects said pump to said power steering valve.

(References on following page)

References Cited in the file of this patent

UNITED STATES PATENTS

| | | |
|---|---|---|
| 2,213,271 | Davis | Sept. 3, 1940 |
| 2,363,179 | Harrington et al. | Nov. 21, 1944 |
| 2,559,065 | Dewandre | July 3, 1951 |
| 2,674,092 | Gardiner | Apr. 6, 1954 |
| 2,708,344 | Greer | May 17, 1955 |
| 2,737,196 | Eames | Mar. 6, 1956 |
| 2,799,995 | Herman | July 23, 1957 |
| 2,818,711 | Lincoln et al. | Jan. 7, 1958 |